(12) United States Patent
Vogel

(10) Patent No.: US 7,079,234 B2
(45) Date of Patent: Jul. 18, 2006

(54) METHOD FOR DETERMINING THE SPATIAL LOCATION AND POSITION OF A REFLECTOR ROD IN RELATION TO A MARKED GROUND POINT

(75) Inventor: Michael Vogel, Schleifreisen (DE)

(73) Assignee: Trimble Jena GmbH, Jena (DE)

( * ) Notice: Subject to any disclaimer, the term of this patent is extended or adjusted under 35 U.S.C. 154(b) by 290 days.

(21) Appl. No.: 10/819,419

(22) Filed: Apr. 7, 2004

(65) Prior Publication Data

US 2004/0223139 A1  Nov. 11, 2004

(30) Foreign Application Priority Data

May 9, 2003 (DE) ............................... 103 21 749

(51) Int. Cl.
*G01C 1/00* (2006.01)

(52) U.S. Cl. .................................. 356/141.1

(58) Field of Classification Search .............. 356/141.1
See application file for complete search history.

(56) References Cited

U.S. PATENT DOCUMENTS 5,294,970 A * 3/1994 Dornbusch et al. ...... 356/141.1
6,873,407 B1 * 3/2005 Vogel ...................... 356/141.4

FOREIGN PATENT DOCUMENTS

| EP | 0 405 423 A2 | 1/1991 |
| WO | WO 99/49280 | 9/1999 |
| WO | WO 01/09642 A1 | 2/2001 |

* cited by examiner

*Primary Examiner*—Thomas H. Tarcza
*Assistant Examiner*—Luke Ratcliffe
(74) *Attorney, Agent, or Firm*—Dinsmore & Shohl LLP

(57) ABSTRACT

A method for determining the position of a reflector rod provided with a reflector, using a sighting beam emitted from a base station is disclosed. The reflector and a first position sensor define a first coordinate system. The direction of the sighting beam to the reflector is measured from the base station in a second coordinate system, using horizontal and vertical angles. A second position sensor arranged in the direction of the sighting axis of the base station determines the location and orientation of the reflector rod. Measurement data in the first coordinate system is generated to determine the spatial orientation of the reflector relative to the light beam. Imaging optics are used to image the reflector on the second position sensor. The position of the reflector in the second coordinate system and the distance from the base station to the reflector are determined.

12 Claims, 1 Drawing Sheet

Figure 1:
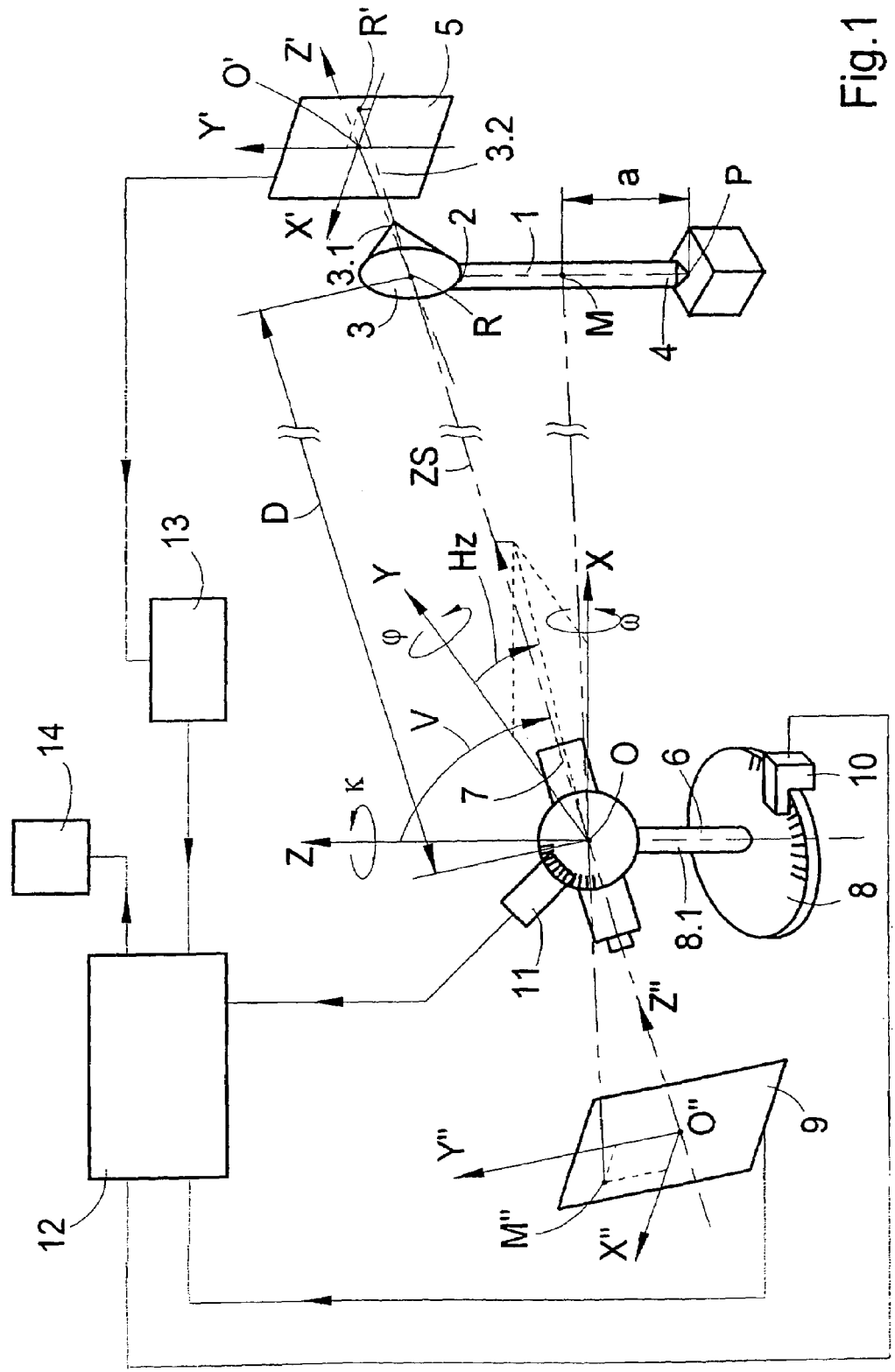

METHOD FOR DETERMINING THE SPATIAL LOCATION AND POSITION OF A REFLECTOR ROD IN RELATION TO A MARKED GROUND POINT

BACKGROUND OF THE INVENTION

The invention is directed to a method for determining the spatial location and position of a reflector rod in relation to a marked ground point, notably when it comes to geodetic measurements in the field.

In geodetic measurements, the location of a ground point, such as a boundary stone, is generally determined with the aid of a reflector that is attached to a reflector rod at a certain height above the ground point. The height of the reflector above the ground point is measured manually in most cases today and, therefore, always constitutes a source of error. In the field, this reflector rod is posed vertically on the ground point. By rotating the rod about the vertical rod axis, the reflector, e.g., a reflector prism or a corner cube prism, is aligned with a tachymeter or with another device employed to carry out the measurements. Following alignment, the actual measurement of horizontal and vertical angles and of distances can be performed. The location of the ground point may be determined wrongly, inter alia, because of incorrect adjustment of the circular level on the reflector rod and improper rod placement on the ground point. Furthermore, perpendicular placement of the rod requires a certain amount of time and is problematic whenever objects, such as shrubs and trees, obstruct the view between the tachymeter and the reflector prism or when points are hidden from view.

Several methods and arrangements are known, with which the spatial location and direction of a reflector rod can be determined. For example, two reflector prisms are arranged on a reflector rod at a known distance. Measuring the distance from the tachymeter to each of the two prisms and the relevant horizontal and vertical angles defines a spatial straight line, on which a point (ground point) located at a certain distance to these prisms can be determined. As a result, this rod can be moved almost freely and signal a variety of different points. Likewise, the calculation model is overdetermined (number of measurements>number of unknowns), so that the measurement can be verified. The fact that the measurements for the two reflectors are carried out separately is a disadvantage, however. On the one hand, this procedure is time-consuming, while on the other a stable spatial location of the rod between two measurements cannot always be guaranteed. According to U.S. Pat. No. 5,512,905, clinometers are used to orient the reflector rod. For this purpose, two clinometers lying vertically to each other are attached to the rod. They are to determine the relevant rotations $\omega$ and $\kappa$ in two directions. But the rotational angle can only be allocated with certainty if the rotation $\phi$ about the reflector rod axis is zero or known. This, however, can be achieved only if the reflector is accurately aligned with the tachymeter. Further, the two tilts of the rod are limited to the working range of the clinometer sensors, thus restricting the free spatial movement of the rod.

WO 01/09642 A1 describes two methods and an arrangement for determining the spatial positions and orientations of reflectors, wherein a cut-off corner of the prism acting as a pinhole diaphragm is provided at the center of a corner cube prism that serves as a reflector. A position-sensitive sensor unit is placed behind this cut-off corner. When a distance is measured, part of the light beam emitted from the tachymeter is imaged onto the surface of the sensor unit through the pinhole diaphragm acting as a pinhole camera. This imaged light spot can be located on the position-sensitive sensor unit, and its position can be determined accordingly. The position of the light spot in the image plane of the sensor unit is dependent on the incident angles of the measuring beam emitted from the laser tracker in relation to the reflector prism.

According to this method, measurement data about the incidence angle of the light beam entering the reflector in relation to the object and/or measurement data about the reflector orientation in relation to the object are generated, and the position and spatial orientation of the object are calculated on the basis of the measurement data about the direction and path length of the light beam as well as on the basis of additional measurement data. This method is primarily used to measure moving objects with an attached reflector prism. Furthermore, the reflector can be constantly corrected vertically to the light beam of the laser tracker with the aid of controlled mechanics. Likewise, it is possible to correct measured values through the angle of incidence and the wavelength.

If the prism is fixed to the object, two rotations of the object in relation to the light beam can be identified. The third rotation, i.e., the rotation about the axis of the prism, cannot be determined in this way, which is a disadvantage of this method.

WO 99/49280 A1 describes another method for determining the location and rotational position of an object, such as leveling staffs and rods, etc. Here, the spatial orientation of a graduated rod or coded staff is determined by a picture record made in a measuring head. A coded staff inclined toward the recording system in every direction is imaged on the sensor of a CCD camera. Using appropriate image processing, a bar code arranged on the staff can be measured from the image content and the direction of the staff in the image can be determined. With the bar code and the direction, it is possible to determine five orientation parameters. Here again, a rotation of the staff about its longitudinal axis cannot be determined. In order to determine the rotation about the longitudinal axis of the staff, an additional code running around the staff must be provided. Another disadvantage is that the imaging optics used must image the bar code in a resolved manner, so that it can be measured in the image. If there are greater distances between the imaging optics and the bar code of the staff, it is no longer possible to image the bar code in a resolved way.

Another arrangement for establishing or defining measuring points in geodetic measurements is known from WO 90/12282 A1. Here, a camera with supplementary optics is arranged on a reflector rod next to a reflector prism. A measurement beam emitted from a measuring instrument penetrates the optics of the camera and is imaged on a position-sensitive sensor of a sensor unit. All three components of the inclination of a reflector rod are measured from the position of the imaged light spot and from the measuring data of two clinometers that are arranged vertically to each other. The fact that additional clinometers are required constitutes a disadvantage.

BRIEF SUMMARY OF THE INVENTION

It is the primary object of the invention to create a method and an arrangement for determining the spatial location of a reflector rod above a support or ground point, wherein the disadvantages of the prior art are largely eliminated and all the rotations of the reflector rod in the coordinate system of the measuring station (base station) are covered in a simple way, with a high degree of reliability and accuracy, and are considered for the determination of measuring values during geodetic measurements.

According to the invention, this object is met by a method for determining the spatial location of a reflector rod above a measuring point (ground point or support point), using the means disclosed in the characterizing clause of the first claim. Details and further embodiments of the invention are described in the other claims.

Accordingly, the method for determining the spatial location and position of a reflector rod, which is provided with a reflector and positioned at a support point located at the target position, defines a first coordinate system through the reflector and a first position sensor linked to the reflector in a firm relationship, using a light beam emitted to the reflector from a light source of a base station.

The direction of the light beam to the reflector is measured in a second coordinate system, using both the horizontal and vertical angles of the sighting axis of the base station emitting the light beam and the distance from the base station to the reflector, as determined from the base station. Here, the second coordinate system is defined by the axes of the base station. Using a second position sensor, which is arranged in the direction of the sighting axis of the base station and whose spatial location and position in the second coordinate system is known, the location and orientation of the reflector rod are identified.

The coordinates and, with them, the position and location of the reflector rod and thus also those of the reflector rod end placed on the support point—which may be a ground point, for example—can now be determined in the coordinate system of the base station by performing the following method steps:

Generation of measurement data in the first coordinate system for determining the spatial orientation of the reflector and, with it, that of the reflector rod in relation to the light beam emitted from the base station, using the first position sensor;

imaging of the reflector rod (together) with the reflector (through imaging optics of the base station) on the second position sensor arranged on the base station;

determination of the reflector location and position in the second coordinate system from the (measured) horizontal and vertical angles and the distance from the base station to the reflector;

determination of the rotation parameters of the spatial orientation of the first coordinate system in relation to the second coordinate system, using the measurement data generated by the first and second position sensors;

determination of the location and position of the measuring point in the second coordinate system, using the location and position of the reflector and the rotation parameters of the spatial orientation of the first coordinate system in relation to the second coordinate system.

Therefore, it is advantageous if the coordinates of a mark arranged on the reflector rod at a known distance a from the reflector rod end placed on the support point are determined in coordinates of the second coordinate system and, using them and the known distance a, the coordinates of the supported reflector rod end are established in the second coordinate system by the evaluation device.

An arrangement for determining the spatial location and position of a reflector rod provided with a fixed-mount reflector and positioned at a support or measuring point located at the target position comprises a base station, such as a tachymeter or a video tachymeter, with a light source emitting a light beam in a sighting axis to the target position, wherein the light source is a laser light source preferably, with a second position sensor for generating measurement data characterizing measurement values and coordinates, wherein the position sensor is arranged in the direction of the sighting axis of the base station and may be configured as a CCD matrix;

with an optical system for imaging the reflector rod together with the reflector on the second position sensor;

with first measuring means, which measure the horizontal angle (Hz) and the vertical angle (V) for determining the direction of the light beam and which define a second coordinate system;

and second measuring means for measuring the distance from the base station to the reflector.

The optical system employed may be the imaging optics of the tachymeter or video tachymeter. The first measuring means used can be the horizontal and vertical angle measuring system of the tachymeter. The second measuring means may be the range finder of the tachymeter, for example.

A first position sensor defining the first coordinate system is arranged at the target position for generating the first measurement data characterizing the location and position of the reflector in relation to the sighting beam, with this position sensor being firmly linked with the reflector in a defined position and orientation. Furthermore, the arrangement comprises an evaluation device for determining (and calculating), in coordinates of the second coordinate system, the spatial location and position of the reflector rod positioned at the support point, with the evaluation device also being linked data-wise (electrically) with the first and second position sensors, as well as with the first and second measuring means provided for measuring the horizontal angle (Hz), the vertical angle (V) and the distance (D).

Known transmitting and receiving devices are provided as a transmission unit for relaying measurement data and electric signals from the base station to the reflector rod and the units arranged there and back.

Accordingly, it is advantageous in the arrangement according to the invention if the reflector is configured as a corner cube prism or as a corner cube reflector.

Further, it is advantageous if the first and/or second position sensors are configured as a CCD matrix or as a CMOS image sensor.

In this connection, it can be of advantage if the first position sensor is arranged immediately next to the reflector with a firm relationship to the latter.

For determining the location and position of the reflector in relation to the light beam targeted at the reflector, it is furthermore of advantage if the first position sensor behind the reflector is arranged in a firm relationship to the latter.

For the exact determination, in the second coordinate system, of the coordinates of the reflector rod end placed on the support point, it is of advantage if a mark is arranged on the reflector rod at a known distance a from the reflector rod end placed on the support point.

For the accurate determination, in the second coordinate system, of the coordinates of the reflector rod end placed on the support point, it can equally be of advantage if the reflector on the reflector rod is arranged at a known distance from the reflector rod end placed on the support point. If this is the case, no mark on the reflector rod is required for the performance of measurements.

The method according to the invention and the arrangement described permit simultaneous determination of the spatial orientation and the height (length) of the reflector rod equipped with the reflector. Provided the sighting beam is imaged on the first position sensor, the reflector rod can be moved freely. For this reason, the method can be employed for geodetic measurement at any time, irrespective of the perpendicular.

Furthermore, the reflector only needs to be roughly aligned with the base station, which reduces the measuring time required. If digital image processing is used, the method can also be carried out in a fully automated or even interactive way.

BRIEF DESCRIPTION OF THE SEVERAL VIEW OF THE DRAWING

The following detailed description of specific embodiments of the present invention can be best understood when read in conjunction with the following drawing, where like structure is indicated with like reference numerals, and in which:

FIG. 1 shows an arrangement of a base station and a reflector rod with reflector and evaluation device according to an embodiment of the present invention.

DETAILED DESCRIPTION OF THE PREFERRED EMBODIMENTS

The arrangement, shown in FIG. 1, for determining the spatial location and position of a reflector rod put up on a ground or support point P at the target position comprises a reflector rod 1 to the upper end 2 of which a reflector 3 is fixed. The lower end 4 of the reflector rod 1 is placed on the support point P. The distance of the reflector 3 to the lower end 4 of the reflector rod 1 resting on the support point P is known for the geodetic measurements to be performed. However, it can also be changed to adapt it to different measurement conditions. The reflector 3 is a corner cube prism, as is common in measurements carried out in the field. Behind the reflector 3 or immediately next to it, a first position sensor 5 is arranged at a fixed, defined position and orientation in relation to the reflector 3 and provides first measurement data characterizing the location and position of the reflector 3 in relation to the sighting beam ZS. A first coordinate system with the coordinate axes X' and Y' lies in the plane of the first position sensor 5. The corresponding coordinate axis Z' stands vertically on this plane and runs through the top 3.1 of the reflector 3. The top 3.1 or the corner of the reflector 3 is designed in such a way that it allows a thin bundle of light 3.2 to pass through toward the first position sensor 5 and that it has the imaging effect of a pinhole camera. A mark M characterized by a known distance a to the lower end 4 is advantageously arranged on the reflector rod 1.

Further, the arrangement comprises a base station 6, which is located at a distance to be measured D from the reflector rod 1 and from which the coordinates of the support point P are to be determined. This base station 6, preferably a tachymeter or a theodolite with a distance meter, is provided with a light source (not shown) emitting a light beam (sighting beam ZS) along a sighting axis 7 to the reflector 3 lying at the target position. The base station 6 forms a spatially stationary, higher-ranking second coordinate system with the coordinate axes X, Y and Z, wherein the horizontal circle 8 of the device constituting the base station 6 and serving to determine the horizontal angle Hz runs parallel to the X-Y plane of the second coordinate system. In the second coordinate system, the Z-axis is formed by the vertical axis 8.1 of the base station intersecting the tilt axis at a point O. Ideally, the origin of this second coordinate system is the point where the axes of the device of the base station 6 intersect. A second, two-dimensional type position sensor 9, such as a CCD matrix or a CMOS image sensor, is provided in the base station 6 for generating second measurement data characterizing measuring values and coordinates. In the drawing, the position sensors 5 and 9 have been greatly enlarged to provide for better graphic clarity. Together, the optical system of the base station 6 and the second position sensor 9 form a camera, e.g., a CCD camera. This second position sensor 9 is arranged in such an advantageous way that the sighting axis 7 always stands vertically on it. Generally, the plane of the second position sensor 9 forms another coordinate system comprising the coordinate axes X" and Y", with the third coordinate axis Z" formed by the sighting axis 7 standing vertically on the second position sensor 9. In addition, the basis station 6 is provided with imaging optics (not shown), with which the reflector rod 1 is imaged together with the reflector 3 on the second position sensor 9. For determining the direction of the light beam emitted from the base station 6 as the sighting beam ZS, the base station is equipped with first measuring means in the form of a horizontal angle measuring system 10 to measure the horizontal angle Hz and a vertical angle measuring system 11 to measure the vertical angle V. Second measuring means in the form of a distance meter (not shown) are provided in the base station 6 for measuring the distance D from the base station 6 to the reflector 3.

A transmission unit 13 is provided for relaying data from the target position to an evaluation device 12 of the base station 6 and back. This evaluation device 12 is also linked with the first and second position sensors 5 and 9, the horizontal angle measuring system 10 and the vertical angle measuring system 11, as well as with a display device 14 for the display and output of measured values.

According to the method for determining the spatial location and position of the reflector rod 1 provided with a fixed-mount reflector 3 and positioned at a measuring point (support point P) located at the target position with the aid of a light beam emitted from a light source of the base station 6 to the reflector 3 and serving as the sighting beam ZS, the reflector 3 and the first position sensor 5 linked with it by a firm relationship define the first coordinate system comprising the coordinate axes X', Y' and Z', as described above.

In the second coordinate system of the base station 6, characterized by the coordinate axes X, Y and Z, the direction of the sighting beam ZS is determined by measuring the horizontal angle Hz through the horizontal angle measuring system 10 and the vertical angle V through the vertical angle measuring system 11. The rotation matrix RT of the camera in the base station 6 can be deduced from these angles Hz and V. The distance D, i.e., the distance from the base station 6 to the reflector 3 on the reflector rod 1, is determined by the distance meter (not shown) of the base station 6. With these values for Hz, V and D, the location of the reflector rod 1 is by no means known yet. Since the reflector rod 1 and the reflector 3 are rigidly connected to each other, the location of the reflector rod 1 in relation to the sighting beam ZS emitted from the base station 6 can be determined by establishing the spatial orientation of the reflector 3.

This is done in a well-known manner by following one of several methods steps. Accordingly, the thin bundle of light 3.2 of the sighting beam ZS passing through the top 3.1 of the reflector 3, which acts as imaging optics, is imaged on the first position sensor 5. The measurement data generated by the first position sensor 5 for the location of the impact point R' of the thin bundle of light 3.2 on the position sensor 5 represent the coordinates X' and Y' in the first coordinate system, which are relayed for further processing to the evaluation device 14 via the transmission unit 12.

According to another method step, the reflector rod 1 is imaged on the second position sensor 9 by the imaging optics of the base station 6, with the position sensor 9 generating measurement data that represent the location of the reflector rod 1 and, with it, that of the reflector 3 in coordinates X" and Y" of the second position sensor 9. These measurement data are also transmitted to the evaluation device 14.

From the measurement data supplied by the first and second position sensors 5 and 9, the evaluation device 14 subsequently determines the rotation parameters of the spatial orientation of the first coordinate system of the first position sensor 5 in relation to the second coordinate system of the base station 6. Based on the location and position of the reflector 3, as measured in the second coordinate system of the base station 6 using the horizontal and vertical angles Hz and V and the distance D, and based on the rotation parameters of the mutual orientation of the first and second coordinate systems, the coordinates X, Y and Z of the point P in the second coordinate system of the base station 6 are calculated, wherein the reflector height can be determined with the aid of the distance a between the mark M of the reflector rod 1 and the lower end 4 of the reflector rod 1 resting on the support point P.

However, if the distance from the reflector 3 to the end 4 of the reflector rod 1 is known, this value can be used in the calculation instead of the distance a.

The method permits simultaneous determination of the orientation and height of the reflector rod 1. Provided the sighting beam ZS hits the first position sensor 5, the reflector rod 1 can be moved freely. Therefore, it is possible to use the method without any restriction from a vertical position of the reflector rod 5. What is more, the reflector 3 only needs to be roughly aligned with the device of the base station 6. If digital image processing is used, the method can also be carried out in a fully automated or even interactive way.

What is claimed is:

1. A method for determining the spatial location and position of a reflector rod provided with a reflector and positioned at a measuring or support point located at the target position, the method comprising:

using a light or sighting beam emitted to the reflector from a light source of a base station, wherein the reflector and a first position sensor linked by a firm relationship define a first coordinate system, wherein the direction of the light beam to the reflector is measured from the base station in a second coordinate system, using both the horizontal and vertical angles of the sighting axis of the base station emitting the light beam and the distance from the base station to the reflector, and wherein the location and orientation of the reflector rod are established with a second position sensor, which is arranged in the direction of the sighting axis of the base station and whose spatial location and position in the second coordinate system is known;

generating measurement data in the first coordinate system for determining the spatial orientation of the reflector and, with it, that of the reflector rod in relation to the light beam emitted from the base station, using the first position sensor;

imaging of the reflector rod together with the reflector through imaging optics of the base station on the second position sensor arranged on the base station;

determining the location and position of the reflector in the second coordinate system from the horizontal and vertical angles measured and the distance from the base station to the reflector;

determining the rotation parameters of the spatial orientation of the first coordinate system in relation to the second coordinate system, using the measurement data generated by the first and second position sensors;

determining the location and position of the measuring or support point in the second coordinate system, using the location and position of the reflector and the rotation parameters of the spatial orientation of the first coordinate system in relation to the second coordinate system.

2. The method according to claim 1, further comprising:

determining the coordinates of a mark arranged on the reflector rod at a known distance from the end of the reflector rod placed on the support point in coordinates of the second coordinate system and, with them and a known distance, the coordinates of the supported end of the reflector rod are established in the second coordinate system by an evaluation device.

3. An arrangement for determining the spatial location and position of a reflector rod provided with a reflector and positioned at a support or measuring point located at the target position, the arrangement comprising:

a base station with a light source emitting a light or sighting beam in a target axis to a target position, with a second position sensor that serves to generate measurement data characterizing measuring values and coordinates and is arranged in the direction of the target axis of the base station, with imaging optics for imaging the reflector rod with the reflector on the second position sensor, with first measuring means that measure the horizontal angle and vertical angle for determining the direction of the light or sighting beam and define a second coordinate system, and second measuring means for measuring the distance from the base station to the reflector;

a first position sensor, which defines the first coordinate system for generating the first measurement data characterizing the location and position of the reflector in relation to the sighting beam and which is firmly linked with the reflector in a defined position and orientation;

an evaluation device for determining and calculating, in coordinates of the second coordinate system, the spatial location and position of the reflector rod positioned at the measuring or support point, wherein the evaluation device is linked data-wise with the first position sensor and the second position sensor, as well as with the first and second measuring means provided for measuring the horizontal angle, the vertical angle and the distance.

4. The arrangement according to claim 3, wherein the reflector is configured as a corner cube prism or as a corner cube reflector.

5. The arrangement according to claims 3, wherein the first position sensor is arranged immediately next to the reflector in a firm relationship to the latter.

6. The arrangement according to claim 3, wherein a mark is arranged on the reflector rod at a known distance from the supported end of the reflector rod placed on the measuring or support point.

7. The arrangement according to claim 3, wherein the reflector is fixed to the reflector rod at a known distance a from the supported end of the reflector rod.

8. The arrangement according to claim 3, wherein the first and the second position sensors are configured as a CCD matrix or as a CMOS image sensor.

9. The arrangement according to claim 8, wherein the first position sensor is arranged immediately next to the reflector in a firm relationship to the latter.

10. The arrangement according to claim 9, wherein the first position sensor is arranged behind to the reflector in a firm relationship to the latter.

11. The arrangement according to claim 10, wherein a mark is arranged on the reflector rod at a known distance from the supported end of the reflector rod placed on the measuring or support point.

12. The arrangement according to claim 10, wherein the reflector is fixed to the reflector rod at a known distance from the supported end of the reflector rod.

* * * * *

UNITED STATES PATENT AND TRADEMARK OFFICE
CERTIFICATE OF CORRECTION

PATENT NO. : 7,079,234 B2
APPLICATION NO. : 10/819419
DATED : July 18, 2006
INVENTOR(S) : Michael Vogel It is certified that error appears in the above-identified patent and that said Letters Patent is hereby corrected as shown below:

Col. 5, Line 8; "perpendicular." should read --perpendicular. Furthermore,--

Col. 6, Line 53, "matrix RT of" should read --matrix $R_T$ of --

Signed and Sealed this

Fifth Day of December, 2006

JON W. DUDAS
*Director of the United States Patent and Trademark Office*